No. 834,333. PATENTED OCT. 30, 1906.
P. N. STOWBY.
FLUID RECEPTACLE.
APPLICATION FILED OCT. 17, 1905.
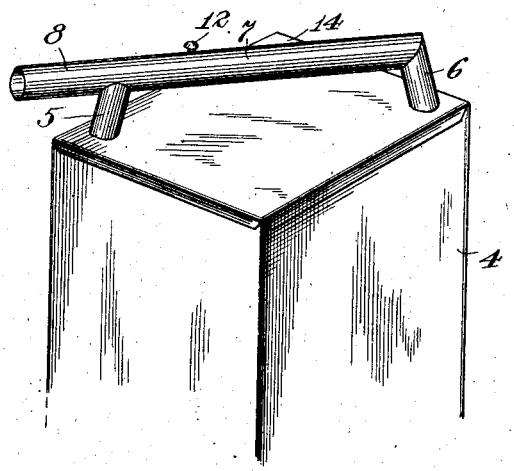
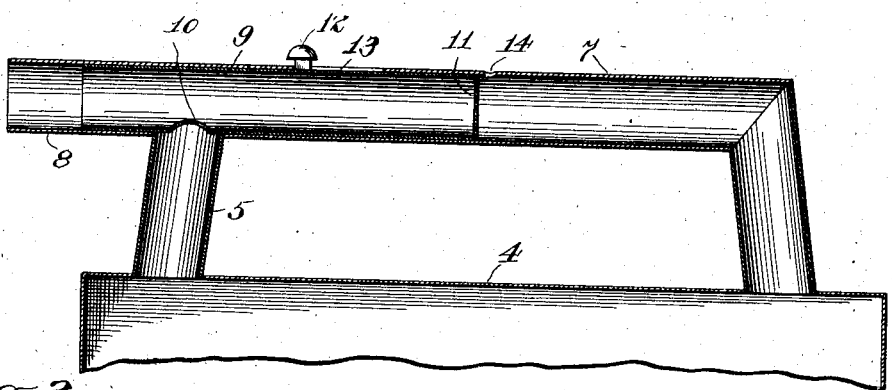
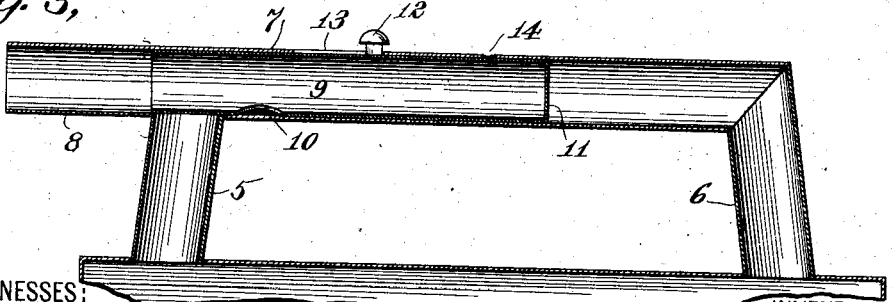

UNITED STATES PATENT OFFICE.

PETER N. STOWBY, OF BROOKLYN, NEW YORK.

FLUID-RECEPTACLE.

No. 834,333.

Specification of Letters Patent.

Patented Oct. 30, 1906.

Application filed October 17, 1905. Serial No. 283,106.

*To all whom it may concern:*

Be it known that I, PETER N. STOWBY, a citizen of the United States of America, and a resident of Brooklyn, county of Kings, State of New York, have invented certain new and useful Improvements in Fluid-Receptacles, of which the following is a specification, reference being had to the accompanying drawings, forming a part thereof.

My invention relates to improvements in fluid-receptacles, and particularly to such receptacles employed for holding oil.

Such receptacles are commonly known in the trade as "oil-cans," and comprise generally a body portion for holding the oil, a handle, a pouring-spout, a valve therefor, a vent, and a filling-opening. Very often the vent and the filling-opening are the same—that is to say, the filling-opening is used as a vent; but this usually involves the employment of a removable part, which is disadvantageous.

In my present invention I provide a combined handle, spout, valve means, vent, and filling-opening, whereby I not only reduce the cost of making the can, but much simplify its operation and dispense with any removable parts.

In carrying out my invention I provide a handle comprising tubular portions connecting with the interior of the receptacle and having an extension comprising a spout, and I provide valve means within the tubular portion operated from the exterior thereof to control egress of liquid and also to control an opening provided in the tubular portion and constituting a vent.

In order that my invention may be fully understood, I will now describe an embodiment thereof with reference to the accompanying drawings, illustrating same, and will then point out the novel features in claims.

In the drawings, Figure 1 is a view in perspective showing the upper portion of a fluid-receptacle embodying my invention. Fig. 2 is a view in central vertical section through the handle portion thereof, showing the valve means in open position ready for emptying or filling the can. Fig. 3 is a similar view showing the valve means in a closed position.

The body portion 4 of the can is shown of the usual rectangular form, secured to the upper end of which is the handle. The handle comprises two tubular uprights 5 and 6, which, as will be readily understood by reference to Figs. 2 and 3, are arranged in open communication with the interior of the receptacle. A horizontal tubular portion 7 is secured to the said tubular uprights, being in open communication at one end with the upright 6 and in open communication at a point intermediate its ends, but near the opposite end, with the upright 5. The portion of the horizontal part 7 extending beyond the tubular upright 5 constitutes a spout 8.

A tubular valve-slide 9 is fitted to slide freely within the horizontal portion 7 of the handle, said tube having a lateral opening 10, adapted to register with the tubular upright 5 and provided with a transverse diaphragm 11. An operating-button 12 is secured to the said tubular slide and extends through a slot 13 in the tubular portion 7. The said tubular portion 7 has a small opening 14 therethrough constituting a vent.

When the valve-slide 9 is in the position shown in Fig. 2, the opening 10 is in register with the upright 5 and the vent 14 is open to the tubular upright 6. The receptacle is now in a position to discharge its contents through the tubular upright 5 and spout 8, air being admitted through the vent 14 and upright 6 to the interior of the vessel to compensate for liquid discharged, or the can may be filled by suitable connection with the spout 8, air in such case discharging outward through the vent 14. When the valve-slide is moved to the position shown in Fig. 3, and it may readily be so moved by manipulation of a button 12, communication between the tubular upright 5 and the horizontal portion 7 of the handle, and hence, of course, with the spout 8, is cut off and the vent 14 is closed. In this condition the receptacle is entirely closed and sealed. The transverse diaphragm 11, it will be seen, always closes communication between the two uprights 5 and 6 through the horizontal portion 7, as at no time is such communication desirable.

The tubular portion 7 constitutes a comfortable grasping portion for the handle proper, and the spout 8 being in a line with the same the liquid pouring therefrom is easily directed.

It will be seen that the device is very simple and inexpensive to make and combines together a number of requisite functions.

The receptacle may of course be employed for other purposes than holding oil, this being merely stated as one of its uses.

What I claim is—

1. In a fluid-receptacle, the combination with tubular portions connecting with the interior of the vessel but closed against fluid circulation from one to the other, one of said tubular portions having an extension forming a spout, and the other having a vent-opening to atmosphere, of a slide for controlling passage of fluid through both the said openings.

2. In a fluid-receptacle the combination with a hollow tubular handle in communication with the interior of the receptacle at two points, and provided with a spout portion, and having a vent, of valve means controlling discharge through said spout and also passage of air through said vent.

3. In a fluid-receptacle the combination with a handle comprising tubular upright portions connecting with the interior of the receptacle, and a tubular horizontal portion connecting with the upright portions, and having at one end an open-ended extension constituting a spout, of valve means comprising a tubular slide controlling communication between said horizontal portion and spout and one of said tubular uprights.

4. In a fluid-receptacle the combination with a handle comprising tubular upright portions connecting with the interior of the receptacle, and a tubular horizontal portion connecting with the upright portions and having at one end an open-ended extension constituting a spout, of valve means controlling communication between said spout and one of said tubular uprights, and between the other of said tubular uprights and atmosphere.

5. In a fluid-receptacle the combination with a handle comprising tubular upright portions communicating with the interior of the receptacle, and a tubular horizontal portion open at one end and in communication at its other end with one of said tubular uprights, said tubular portion in communication intermediate its ends with the other tubular upright, of valve means comprising a tube arranged to slide within said horizontal tubular portion to control the connection with said last-named tubular upright, and having a transverse diaphragm for preventing communication between said tubular uprights through said horizontal portion.

6. In a fluid-receptacle the combination with a handle comprising tubular upright portions 5 and 6, and a horizontal portion 7 in communication therewith, closed at one end and having an extension 8 to form a spout at the other, and having a vent 14, of a tubular valve-slide 9 within the portion 7, arranged to control passage of liquid from the tubular upright 5, and passage of air through the vent 14, said slide provided with a transverse diaphragm 11 and with an operating-button 12.

In witness whereof I have hereunto set my hand this 25th day of September, 1905.

PETER N. STOWBY.

Witnesses:
C. F. CARRINGTON,
LYMAN S. ANDREWS, Jr.